United States Patent
Kuo et al.

[11] Patent Number: 5,853,820
[45] Date of Patent: Dec. 29, 1998

[54] CONTROLLED LASER TEXTURING GLASS-CERAMIC SUBSTRATES FOR MAGNETIC RECORDING MEDIA

[75] Inventors: David Kuo, Castro Valley; Don Polensky, San Jose, both of Calif.

[73] Assignee: Seagate Technology, Inc., Scotts Valley, Calif.

[21] Appl. No.: 880,368

[22] Filed: Jun. 23, 1997

[51] Int. Cl.[6] .................................................. B05D 3/00
[52] U.S. Cl. ...................... 427/555; 427/128; 427/129; 427/131; 427/554; 427/596
[58] Field of Search .................................. 427/555, 554, 427/128, 131, 129, 596

[56] References Cited

U.S. PATENT DOCUMENTS

| | | |
|---|---|---|
| 3,674,340 | 7/1972 | Jacob . |
| 3,689,293 | 9/1972 | Beall . |
| 3,732,087 | 5/1973 | Grossman . |
| 3,764,218 | 10/1973 | Schedewie . |
| 3,938,878 | 2/1976 | Fox . |
| 4,060,306 | 11/1977 | Swaminathan . |
| 4,139,263 | 2/1979 | Lehureau et al. . |
| 4,386,162 | 5/1983 | Beall . |
| 4,467,039 | 8/1984 | Beall et al. . |
| 4,608,348 | 8/1986 | Beall et al. . |
| 4,971,932 | 11/1990 | Alpha et al. . |
| 5,062,021 | 10/1991 | Ranjan et al. . |
| 5,128,914 | 7/1992 | Kurata et al. . |
| 5,166,006 | 11/1992 | Lal et al. . |
| 5,202,810 | 4/1993 | Nakamura et al. . |
| 5,273,834 | 12/1993 | Hoover et al. . |
| 5,391,522 | 2/1995 | Goto et al. . |
| 5,402,407 | 3/1995 | Eguchi et al. . |
| 5,416,755 | 5/1995 | Endo et al. . |

OTHER PUBLICATIONS

Kuo et al., "Laser Zone Texturing on Glass and Glass-Ceramic substrates," presented at The Magnetic Recording Conference (TMRC), Santa Clara, California, Aug. 19–21, 1996.

Baumgart et al. "A New laser Texturing Technique for High Performance Magnetic Disk Drives," IEEE Transactions on Magnetics, vol. 31, No. 6, pp. 2946–2951, Nov. 1995.

*Primary Examiner*—Bernard Pianalto
*Attorney, Agent, or Firm*—McDermott, Will & Emery

[57] ABSTRACT

The height of protrusions formed during laser texturing a glass-ceramic substrate is controlled by controlling the amount of the crystalline-phase of the substrate, to less than 70% by volume. In an embodiment, the amount of crystalline-phase is controlled by heating under controlled conditions to convert a glass substrate into the glass-ceramic substrate comprising a controlled amount of crystalline phase.

19 Claims, 4 Drawing Sheets

CONTROLLED LASER TEXTURING GLASS-CERAMIC SUBSTRATES FOR MAGNETIC RECORDING MEDIA

TECHNICAL FIELD

The present invention relates to the recording, storage and reading of magnetic data, particularly rotatable magnetic recording media, such as thin film magnetic disks having textured surfaces for contact with cooperating magnetic transducer heads. The invention has particular applicability to high density magnetic recording media for mobile computer data storage applications.

BACKGROUND ART

Thin film magnetic recording disks and disk drives are conventionally employed for storing large amounts of data in magnetizable form. Typically, one or more disks are rotated on a central axis in combination with data transducer heads. In operation, a typical contact start/stop (CSS) method commences when the head begins to slide against the surface of the disk as the disk begins to rotate. Upon reaching a predetermined high rotational speed, the head floats in air at a predetermined distance from the surface of the disk due to dynamic pressure effects caused by air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions allowing data to be recorded on and retrieved from the surface of the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the stop and during deceleration just prior to completely stopping. Each time the head and disk assembly is driven, the sliding surface of the head repeats the cyclic operation consisting of stopping, sliding against the surface of the disk, floating in the air, sliding against the surface of the disk and stopping.

It is considered desirable during reading and recording operations to maintain each transducer head as close to its associated recording surface as possible, i.e., to minimize the flying height of the head. Thus, a smooth recording surface is preferred, as well as a smooth opposing surface of the associated transducer head, thereby permitting the head and the disk to be positioned in close proximity with an attendant increase in predictability and consistent behavior of the air bearing supporting the head. However, if the head surface and the recording surface are too flat, the precision match of these surfaces gives rise to excessive stiction and friction during the start up and stopping phases, thereby causing wear to the head and recording surfaces eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve polishing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers.

A typical magnetic recording medium is depicted in FIG. 1 and comprises a substrate 10, typically an aluminum (Al)-base alloy, such as an aluminum-magnesium (Al—Mg) alloy, plated with a layer of amorphous nickel-phosphorous (NiP). There are typically sequentially deposited on substrate 10 a chromium (Cr) or Cr-alloy underlayer 11, a magnetic layer 12 which is usually a cobalt (Co)-base alloy, a protective overcoat 13 which usually comprises carbon, and a lubricant topcoat 14. Cr or Cr-alloy underlayer 11, Co-base alloy magnetic layer 12 and protective carbon overcoat 13 are typically deposited by sputtering techniques. A conventional Al-alloy substrate is provided with a NiP plating primarily to increase the hardness of the Al substrate, serving as a suitable surface for polishing to provide the requisite surface roughness or texture, which is intended to be substantially replicated on the disk surface.

The escalating requirements for high areal recording density impose increasingly greater requirements on thin film magnetic media in terms of coercivity, stiction, squareness, low medium noise and narrow track recording performance. In addition, increasingly high density and large-capacity magnetic disks require increasingly smaller flying heights, i.e., the distance by which the head floats above the surface of the disk in the CSS drive. The requirement to further reduce the flying height of the transducer head renders it particularly difficult to satisfy the requirements for controlled texturing to avoid head crash.

Conventional techniques for providing a disk substrate with a textured surface comprise a mechanical operation, such as polishing. See, for example, Nakamura et al., U.S. Pat. No. 5,202,810. Conventional mechanical texturing techniques are attendant with numerous disadvantages. For example, it is extremely difficult to provide a clean textured surface due to debris formed by mechanical abrasions. Moreover, the surface inevitably becomes scratched during mechanical operations, which contributes to poor glide characteristics and higher defects. In addition, various desirable substrates are difficult to process by mechanical texturing. This undesirably limiting facet of mechanical texturing, virtually excludes the use of many materials for use as substrates.

An alternative texturing technique to mechanical texturing comprises the use of a laser light beam focused on an upper surface of a non-magnetic substrate. See, for example, Ranjan et al., U.S. Pat. No. 5,062,021, wherein the disclosed method comprises polishing an NiP plated Al substrate to a specular finish, and then rotating the disk while directing pulsed laser energy over a limited portion of the radius, to provide a textured landing zone leaving the data zone specular. The landing zone comprises a plurality of individual laser spots characterized by a central depression surrounded by a substantially circular raised rim.

Another laser texturing technique is reported by Baumgart et al. "A New Laser Texturing Technique for High Performance Magnetic Disk Drives," IEEE Transactions on Magnetics, Vol. 31, No. 6, pp. 2946–2951, November 1995. The laser texturing technique disclosed by Baumgart et al. employs a single focusing lens, and the shape of the resulting protrusions are shown to be altered by adjusting the pulse energy. At low pulse energies, the bump or protrusion shape comprises a central depression and a surrounding rim, similar to that reported by Ranjan et al. As the pulse energy is increased, the bottom of the depression flattens into a rounded, smooth, central dome resembling a "sombrero." At higher powers, the central dome broadens and decreases in height to eventually become equal to or lower than the rim.

In copending application Ser. No. 08/666,374 filed on Jun. 27, 1996, a laser texturing technique is disclosed employing a multiple lens focusing system for improved control of the resulting topographical texture. In copending application Ser. No. 08/666,374 filed on Jun. 27, 1996, a laser texturing technique is disclosed wherein a pulsed, focused laser light beam is passed through a crystal material to control the spacing between resulting protrusions.

Conventional laser texturing techniques have previously been applied to metal-containing substrates or substrates having a metal-containing surface, such as Ni—P plated Al or Al-base alloys. Such substrates, however, exhibit a tendency toward corrosion and are relatively fragile, thereby limiting their utility so that they are not particularly desirable for use in mobile computer data storage applications, such as laptop computers. Glass and glass-ceramic substrates exhibit superior resistance to shock than Ni—P coated Al or Al-alloy substrates. Accordingly, glass and glass-ceramic substrates are desirable candidates for use in mobile computer data storage applications. However, it is extremely difficult to provide an adequate texture on a glass or a glass-ceramic substrate, particularly in view of the escalating requirements for high areal recording density.

Conventional practices for texturing a glass or glass-ceramic substrate comprise heat treatment. Goto et al., U.S. Pat. No. 5,391,522, discloses a glass ceramic substrate suitable for use in a magnetic recording medium. A textured surface is provided by heat treatment, during which the recrystallization temperature is maintained for about 1 to about 5 hours to generate secondary crystal grains forming the surface texture characterized by irregular protrusions with surrounding valleys extending into substrate.

Hoover et al., U.S. Pat. No. 5,273,834 discloses the use of alternate substrates, such as glass-ceramic substrates. The substrate material is provided with ions for absorbing radiation in the near infrared portion of the spectrum, thereby rendering the material capable of attaining elevated temperatures during film deposition.

The use of heat treatment to form a textured surface on alternate substrates, such as glass or glass-ceramic substrates, is undesirably slow and inefficient in terms of energy consumption. Significantly, it is extremely difficult to exercise control over the size and shape of the secondary crystal grains due to inherent limitations in controlling temperature uniformity. Accordingly, it is virtually impossible to provide a glass or glass-ceramic substrate with a controlled textured landing zone for optimizing flying height and maximizing data zone recording density. Moreover, the resulting texture comprises irregularly shaped protrusions with surrounding valleys extending into the substrate, thereby creating undesirable stress profiles during subsequent deposition of layers by sputtering at elevated temperatures. Such undesirable stress profiles render it extremely difficult to accurately replicate the texture in subsequently deposited layers.

In copending PCT application Ser. No. PCT/US96/06830 (Our Docket No. 2674-012PCT), a method is disclosed for laser texturing a glass or glass-ceramic substrate employing a laser light beam derived from a $CO_2$ laser source. The textured glass or glass-ceramic substrate surface comprises a plurality of protrusions which extend above the substrate surface, without surrounding valleys extending substantially into the substrate as is characteristic of a laser textured metallic substrate. The effect of laser parameters, such as pulse width, spot size and pulse energy, and substrate composition on the protrusion or bump height of a laser textured glass or glass-ceramic substrate is reported by Kuo et al., "Laser Zone Texturing on Glass and Glass-Ceramic Substrates," presented at The Magnetic Recording Conference (TMRC), Santa Clara, Calif., Aug. 19–21, 1996. In copending application Ser. No. 08/796,830 filed on Feb. 7, 1997, there is disclosed a method of manufacturing a magnetic recording medium, which method comprises laser texturing a glass or glass-ceramic substrate, and controlling the height of the protrusions by controlling the quench rate during resolidification of the laser formed protrusions, as by heating the substrate during resolidification.

There remains a need for a magnetic recording medium comprising a glass or glass-ceramic substrate having an accurately controlled texture, and for a method of laser texturing a glass-ceramic substrate, wherein the height of the protrusions extending above the substrate surface is controlled and the sensitivity of the protrusion height to pulse energy is reduced.

DISCLOSURE OF THE INVENTION

An object of the present invention is a magnetic recording medium comprising a glass-ceramic substrate having an accurately controlled topographical texture.

Another object of the present invention is a method of laser texturing a glass-ceramic substrate by controlling the height of the resulting protrusions formed on the substrate surface and reducing the sensitivity of the protrusion height to pulse energy.

Additional objects, advantages and other features of the invention will be set forth in the description which follows and in part will become apparent to those having ordinary skill in the art upon examination of the following or may be learned from the practice of the invention. The objects and advantages of the invention may be realized and obtained as particularly pointed out in the appended claims.

According to the present invention the foregoing and other objects are achieved in part by a method of manufacturing a magnetic recording medium, which method comprises: texturing a surface of a glass-ceramic substrate with a pulsed, focused laser light beam to form a plurality of protrusions on and extending above the substrate surface; wherein the crystalline phase of the glass-ceramic substrate is less than about 70% by volume, for example, below about 50% by volume.

Another aspect of the present invention is a method of manufacturing a magnetic recording medium, which method comprises: texturing a surface of a glass-ceramic substrate with a pulsed, focused laser light beam to form a plurality of protrusions on and extending above the substrate surface; and controlling the height of the protrusions by controlling the amount of crystalline phase of the glass-ceramic substrate under about 70% by volume, for example, below about 50% by volume.

A further aspect of the present invention is a magnetic recording medium comprising: a non-magnetic glass-ceramic substrate having an upper surface; and a magnetic layer on the upper surface; wherein: the upper surface contains a textured landing zone comprising a plurality of protrusions of secondary crystals grown on the upper surface by a focused, pulsed laser light beam; and the glass-ceramic substrate comprises less than about 70% by volume of crystalline phase.

Additional objects and advantages of the present invention will become readily apparent to those skilled in the art from the following detailed description, wherein embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
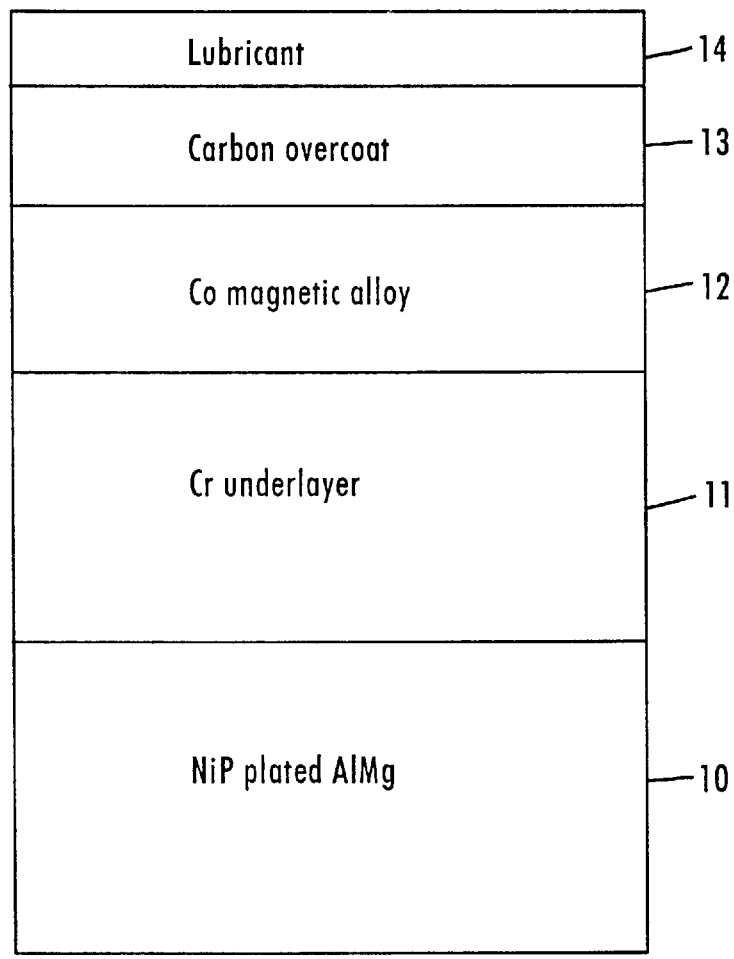
FIG. 1 schematically depicts a conventional magnetic recording medium structure.

In laser texturing a glass or glass-ceramic substrate, as with a $CO_2$ laser, the resulting topographical texture comprises a plurality of rounded protrusions extending above the substrate surface, without surrounding valleys extending substantially into the substrate as in texturing a metal-containing surface, such as an NiP plated Al or Al-alloy substrate. Such relatively uniform protrusions improve the tribological performance of the resulting magnetic recording medium, by enabling the independent optimization of surface topography in each of the landing zone and data zone. However, the height of the protrusions is one of the most critical parameters in that it directly impacts glide and tribological performance. Protrusion height is dependent upon several factors, including spot size, pulse width and pulse energy. Accordingly, the present invention comprises a method of laser texturing a glass-ceramic substrate wherein the height of the resulting protrusions extending above the substrate surface is controlled to optimize glide and tribological performance.

After considerable experimentation and investigation, it was found that a net volume gain is experienced in forming laser protrusions (bumps) on glass-ceramic substrates; whereas, laser protrusions formed on NiP/Al substrates typically exhibit a negligible volume change. It was also found that the height of laser protrusions formed on a glass-ceramic substrate is extremely sensitive to pulse energy. As pulse energy increases, dome-shaped bumps grow in size and height. It was noted that the top of the dome gradually flattens out and eventually collapses to form crater-shaped bumps at elevated pulse energy. Bump or protrusion height varies fairly linearly with pulse energy at a low energy range, wherein the protrusion shape basically remains dome like. As the dome like shape transforms into a crater like shape, bump height essentially becomes flat with pulse energy.

In accordance with the present invention, the overall protrusion height is reduced and the sensitivity of protrusion height to pulse energy is further reduced by controlling the amount of crystalline phase in the glass-ceramic substrate material subject to laser texturing. In accordance with the present invention, the amount of crystalline phase of a glass-ceramic substrate is controlled under about 70% by volume, for example, less than about 50% by volume, even less than about 30% by volume. As the density generally increases with increasing crystalline phase for a glass-ceramic material, as the density of a glass-ceramic material decreases, greater control can be exercised over the height of the protrusion. Accordingly, the glass-ceramic substrate employed in the practice of the present invention typically has a density less than about 2.44 g/cc, for example, below about 2.4255 g/cc.

Conventionally, a glass-ceramic article is formed by controlled crystallization, in situ, of a glass article. Conventionally, in manufacturing glass-ceramic materials, a batch of glass-forming ingredients containing a nucleating or crystallization-promoting agent is initially melted to form a homogeneous liquid which is then simultaneously cooled and shaped to form a glass article of desired dimensions and configuration. The thus formed glass article is subsequently heat treated in accordance with a defined time-temperature schedule to develop nuclei in the glass which act as sights for the growth of crystals as heat treatment proceeds. The structure of the resulting glass-ceramic articles comprises relatively uniformly-size crystals homogeneously dispersed in a residual glassy matrix, which crystalline phase constitutes the predominant proportion of the article.

Although glass-ceramic articles are frequently described as containing in excess of 50% crystalline phase they are, in numerous instances, actually over 75% crystalline. It is the presence of crystalline phase which provides the desired high strength properties of a glass-ceramic material for use as a substrate in a magnetic recording medium. See, for example, Grossman, U.S. Pat. No. 3,732,087 and Beall, U.S. Pat. No. 3,689,293. Thus, conventional wisdom in the art seeks to maximize the amount of crystalline phase to maximize strength. Prior efforts have been made to further increase the strength of a glass-ceramic substrate by formation of particular types of crystalline phases in a glass-ceramic substrate. See, for example, Beall et al., U.S. Pat. No. 4,608,348; Beall et al., U.S. Pat. No. 4,467,039; Beall, U.S. Pat. No. 4,386,162 and Alpha et al., U.S. Pat. No. 4,971,932.

Accordingly, in selecting a glass-ceramic substrate for use in a magnetic recording medium, conventional practices comprise selecting a glass-ceramic material with a high crystalline phase, i.e., above 75% by volume, for high strength. However, upon experimentation and investigation, we discovered that the height of a laser formed protrusion extending above a glass-ceramic substrate increases as the amount of crystalline phase in the glass-ceramic substrate increases. We further discovered that the protrusion height sensitivity to laser pulse energy also increases as the amount of crystalline phase in the glass-ceramic substrate increases.

In accordance with the present invention, the protrusion height sensitivity to pulse energy and protrusion height itself are controlled by controlling the amount of crystalline phase in the glass-ceramic substrate. In an embodiment of the present invention, a conventional glass formulation is prepared and cast into a substrate of a desired shape and dimensions. However, in accordance with the present invention, the heat treatment to effect nucleation and growth of a crystalline phase is controlled, as by controlling time and temperature, so that the resulting glass-ceramic substrate comprises less than about 70% by volume of crystalline phase, for example, below about 50% by volume, even below 30% by volume.

It is recognized that competing objectives are involved, i.e., the greater the amount of crystalline phase the higher the strength, but the higher the protrusion height which adversely affects glide and tribological performance of the resulting magnetic recording medium. In accordance with the present invention, the protrusion height and protrusion height sensitivity to pulse energy is reduced by limiting the amount of crystalline phase in a sufficient amount to achieve that objective, while ensuring that a sufficient amount of crystalline phase is retained in situations requiring strength. One having ordinary skill in the art, given the objectives of the present invention, can easily optimize the time and temperature for heat treating a glass substrate to achieve a desired volume of crystalline phase for a particular application. It has been found, for example, that heating for a temperature of about 400° C. for about 120 minutes to about 650° C. for about 240 minutes is generally sufficient to limit the amount of crystalline phase to below about 70% by volume and retain satisfactory strength.

Thus, in accordance with the present invention, the bump height or protrusion height of laser formed protrusions during laser texturing of a glass-ceramic substrate is controlled to less than about 150 nm, preferably less than about 100 nm, and the sensitivity of the protrusion height to pulse energy decreased, by limiting the amount of crystalline phase to less than about 70% by volume, such as less than about 50% by volume, even less than about 30% by volume. Typically, the glass-ceramic substrates employed in the present invention have a density less than about 2.44 g/cc, for example, less than about 2.4255 g/cc. The inventive method can be employed to accurately form a landing zone with improved tribological performance by virtue of the precisely controlled uniform protrusions having a controlled height extending about the substrate surface.

Figure 2:
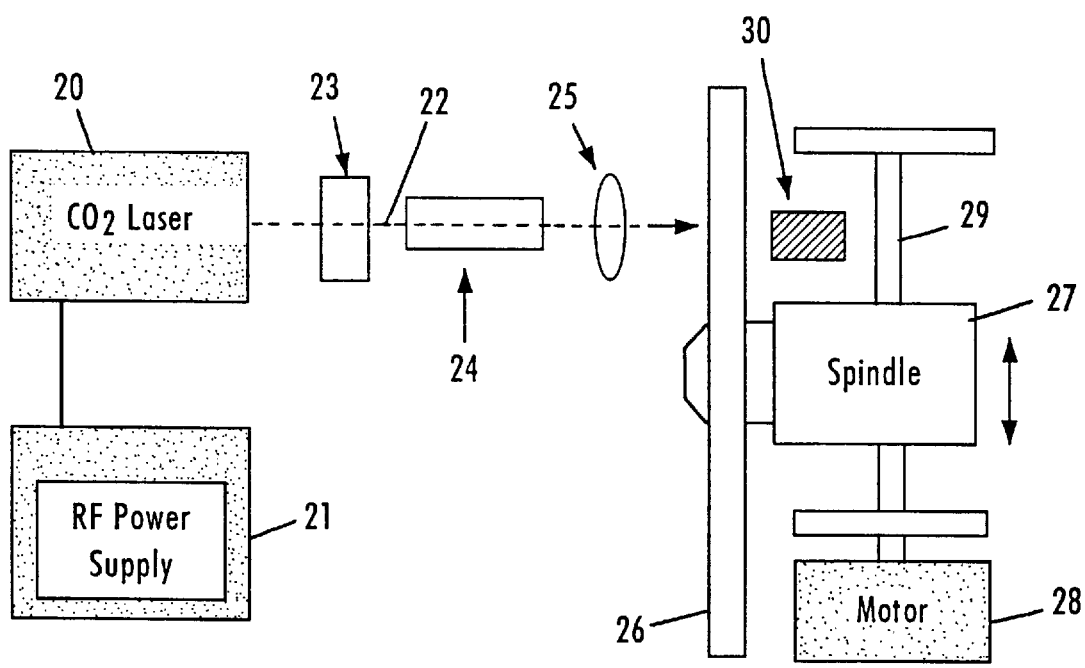
FIG. 2 schematically depicts a laser texturing system in accordance with an embodiment of the present invention.

The inventive method can be practiced employing the apparatus schematically depicted in FIG. 2 which comprises a $CO_2$ laser 20 pulsed by RF driver 21. Emitted laser light beam 22 passes through variable beam attenuator 23 and beam expander 44. Expanded laser light beam 22 is then focused by lens 25 onto the surface of rotating substrate 26 which is driven by spindle 27 powered by motor 28. Substrate 26 and spindle 27 are mounted on a linear slide 29. A thermopile detector 30 measures the average laser power, which can be easily translated into pulse energy.

Consistent with conventional practices, opposite surfaces of a glass-ceramic substrate can be laser textured in accordance with the present invention. The present invention enables accurate control of the height of laser formed protrusions, thereby optimizing tribological and magnetic performance compatible with the escalating requirements for high areal density and mobile computer data storage applications, such as laptop computers. In practicing the present invention, conventional glass formulations can be heat treated to form a glass-ceramic substrate having a controlled amount of crystalline phase. The substrate is normally initially polished to provide a specular surface and a landing zone accurately formed thereon by laser texturing, leaving a specular data zone with maximized areal recording density.

The magnetic layers deposited in accordance with the present invention can be any of those conventionally employed in the production of magnetic recording media. Such conventional magnetic alloys, include, but are not limited to, cobalt (Co)-base alloys, such as cobalt-chromium (CoCr), cobalt-samarium (CoSm), cobalt-chromium-tantalum (CoCrTa), cobalt-nickel-chromium (CoNiCr), cobalt-chromium-samarium (CoCrSm), cobalt-chromium-platinum-tantalum (CoCrPtTa), cobalt-chromium-platinum (CoCrPt), cobalt-nickel-platinum (CoNiPt), cobalt-nickel-chromium-platinum (CoNiCrPt) and cobalt-chromium-platinum-boron (CoCrPtB). The thickness of the magnetic layer is consistent with conventional practices and manufacturing a magnetic recording medium. Cobalt-base alloys having a thickness of about 100 Å to about 1000 Å, such as 200 Å to about 500 Å, has been found suitable.

As in conventional practices, an underlayer can be deposited on the textured substrate prior to depositing the magnetic layer. The underlayer can comprise chromium or a chromium-alloy, such as chromium-vanadium or chromium-titanium, oxygen-doped chromium, tungsten or a tungsten alloy.

In addition, a protective overcoat, such as a carbon overcoat, can be deposited on the magnetic layer, and a lubricant topcoat deposited on the protective overcoat. The underlayer, magnetic layers and protective overcoat can be applied in a conventional manner, by any of various sputtering techniques, deposited in conventional thicknesses employed in production of magnetic recording media.

Figure 3:
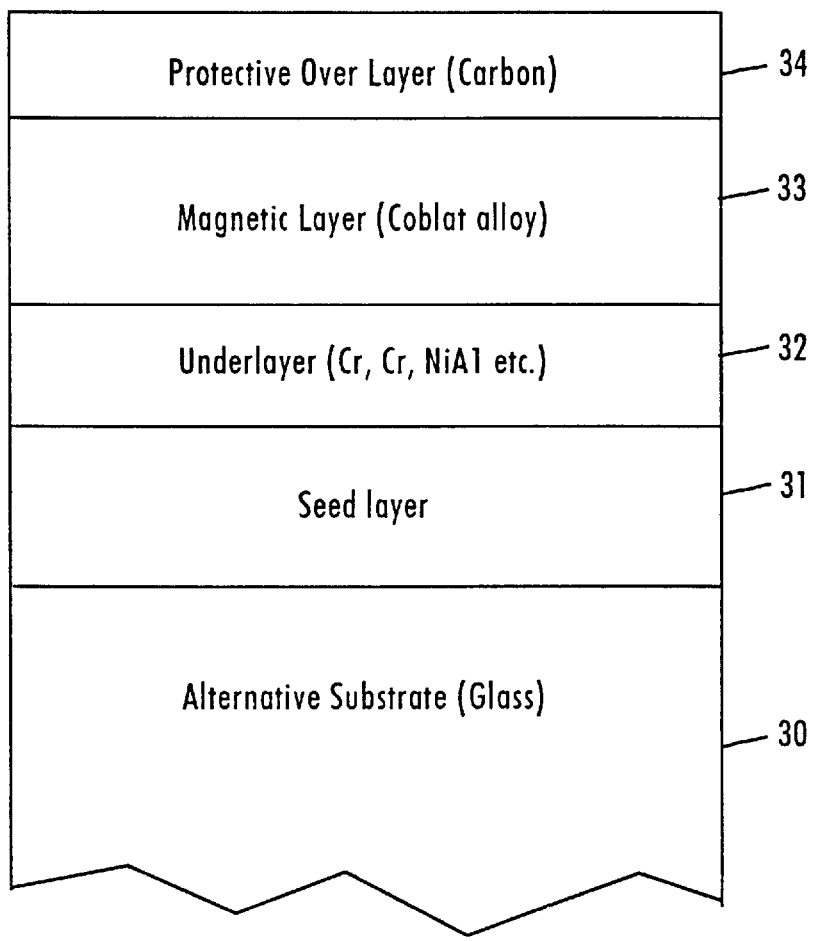
FIG. 3 schematically depicts a magnetic recording medium structure in accordance with the present invention.

A magnetic recording medium in accordance with the present invention is illustrated in FIG. 3 and comprises a glass-ceramic substrate 30 having a controlled amount of crystalline phase below about 70% by volume. An optional seed layer 31 is sputter deposited thereon for controlling the crystallographic orientation of the subsequently deposited layers. Underlayer 32, magnetic layer 33 and protective overcoat 34 are sequentially deposited on substrate 30 or optional seed layer 31.

EXAMPLE

Comparison testing was conducted to demonstrate the dramatic impact of the amount of crystalline phase of a glass-ceramic substrate on a laser textured surface. Glass-ceramic A and glass-ceramic B, as set forth in Table I, were prepared for comparison testing. The density and crystalline content of glass-ceramic B was greater than the density and ceramic content of glass-ceramic A. Glass A and glass B have the identical composition. It should be noted that the density decreases from the glass-ceramic phase to the glass phase for substrates of the same composition. The change in density is more pronounced for glass-ceramic B than for glass-ceramic A.

TABLE I

| (gm/cc) | Glass-ceramic | Glass |
| --- | --- | --- |
| A | 2.44 | 2.39 |
| B | 3.00 | 2.63 |

Figure 4:
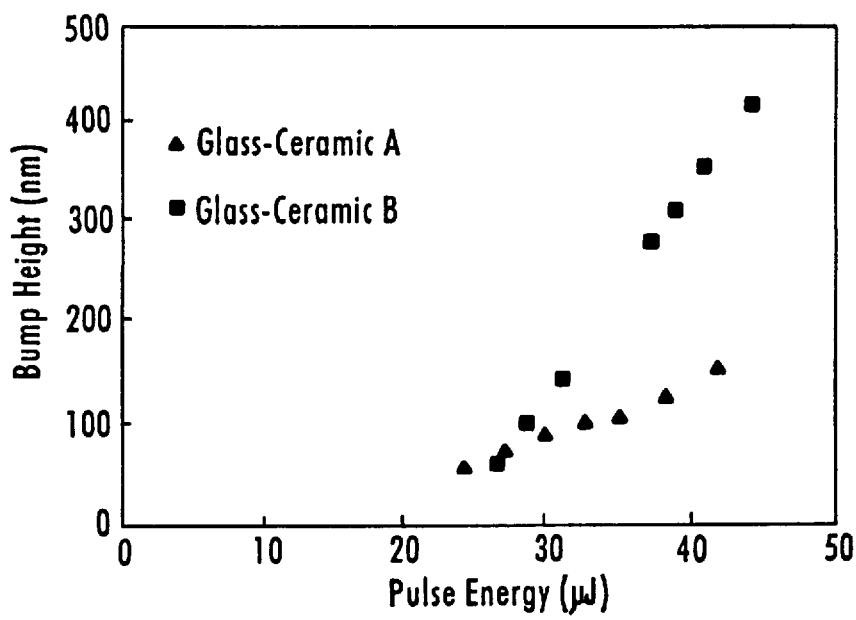
FIG. 4 compares protrusion height and pulse energy for glass-ceramic substrates having different amounts of crystalline phase.

In FIG. 4, the protrusion height vs. pulse energy for glass-ceramic A and B are shown. The threshold energy for glass-ceramic B to form laser bumps is greater than that of glass-ceramic A due to its higher transition temperature. However, the protrusion height increases more sharply and exhibits a linear relationship with pulse energy, which may reflect the fact that the density difference between the glass-ceramic phase and glass phase is significantly greater for glass-ceramic B. It is noted, however, that the protrusion shape remains dome-like for glass-ceramic B without noticeable top flattening or collapsing as in the case for glass-ceramic A.

Figure 5:
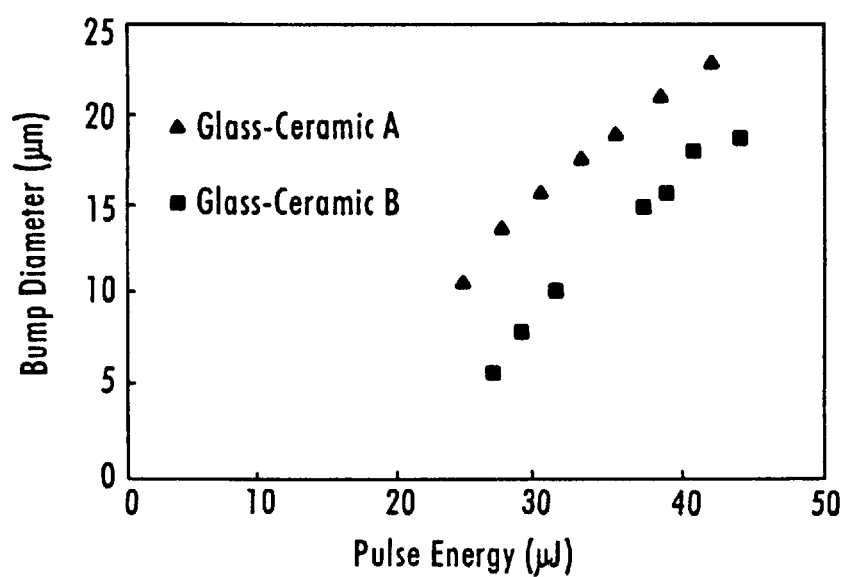
FIG. 5 depicts the bump diameter and pulse energy relationship for glass-ceramic substrates having different amounts of crystalline phase.

FIG. 5 depicts the bump diameter and pulse energy relationship for both glass-ceramic A and glass-ceramic B. Again, apparently due to the lower transition temperature, the bump diameter of glass-ceramic A is substantially larger than that of glass-ceramic B, even though the bump height is lower in most cases.

The operative mechanism enabling reduction of the laser formed protrusion height sensitivity of protrusion height to pulse energy by controlling the amount of crystalline phase is not known with certainty. However, it is believed that the reduction in the amount of crystalline phase results in a lower transition temperature and, hence, pulse energy required to form specific bump height and, hence, lower the sensitivity of bump height to power variation.

The present invention can be employed to produce any of various types of magnetic recording media including thin film disks, with an attendant improvement in flying stability, glide performance and head-medium interface reliability. Moreover, the precise manner in which a landing zone is laser textured enables increased areal recording density, e.g., an increase of 40% or more, and a reduction in the size of head sliders. In practicing the present invention, one having ordinary skill in the art can easily optimize the annealing regimen in terms of time and temperature in order to achieve a desired degree of crystalline phase consistent with the objectives of the present invention.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. A method of manufacturing a magnetic recording medium, which method comprises:
    texturing a surface of a glass-ceramic substrate with a pulsed, focused laser light beam to form a plurality of protrusions on and extending above the substrate surface; wherein the crystalline phase of the glass-ceramic substrate is less than about 70% by volume.

2. The method according to claim 1, wherein the crystalline phase is less than about 50% by volume.

3. The method according to claim 2, wherein the density of the glass-ceramic substrate is less than about 2.4255 g/cc.

4. The method according to claim 1, wherein the density of the glass-ceramic substrate is less than about 2.44 g/cc.

5. The method according to claim 1, comprising:
    preparing a glass substrate; heating to convert the glass substrate into a glass-ceramic substrate comprising less than about 70% by volume of crystalline phase; and laser texturing the surface of the glass-ceramic substrate.

6. The method according to claim 5, comprising heating to convert the glass substrate into a glass-ceramic substrate comprising less than about 50% by volume of crystalline phase.

7. The method according to claim 5, wherein the glass-ceramic substrate has a density less than about 2.44 g/cc.

8. The method according to claim 7, wherein the glass-ceramic substrate has a density less than about 2.4255 g/cc.

9. The method according to claim 1, comprising laser texturing the substrate surface with a laser light beam derived from a $CO_2$ laser source.

10. The method according to claim 1, comprising rotating the substrate during laser texturing.

11. The method according to claim 1, comprising laser texturing a portion of the substrate surface to form a landing zone.

12. The method according to claim 1, further comprising depositing a magnetic layer on the laser textured substrate surface.

13. The method according to claim 1, comprising:
    depositing an underlayer on the laser textured substrate surface; and
    depositing a magnetic layer on the underlayer;
    wherein the textured surface is substantially replicated on subsequently deposited layers.

14. The method according to claim 1, comprising controlling the height of the protrusions to less than about 100 nm.

15. A method of manufacturing a magnetic recording medium, which method comprises:
    texturing a surface of a glass-ceramic substrate with a pulsed, focused laser light beam to form a plurality of protrusions on and extending above the substrate surface; and
    controlling the height of the protrusions by controlling the amount of crystalline phase of the glass-ceramic substrate under about 70% by volume.

16. The method according to claim 15, comprising:
    controlling the height of the protrusions by controlling the amount of crystalline phase of the glass-ceramic substrate under about 50% by volume.

17. The method according to claim 15, comprising controlling the height of the protrusions by further controlling the density of the glass-ceramic substrate to less than about 2.44 g/cc.

18. The method according to claim 17, comprising controlling the height of the protrusions by further controlling the density of the glass-ceramic substrate to less than about 2.4255 g/cc.

19. The method according to claim 15, comprising controlling the amount of the crystalline phase of the glass-ceramic substrate by:
    preparing a glass substrate; and
    heating the glass substrate under at a controlled temperature for a controlled period of time to form the glass-ceramic substrate having a controlled amount of crystalline phase.

* * * * *